T. WIGHT.
ABSORPTION TANK.
APPLICATION FILED JULY 22, 1918.
1,395,463.
Patented Nov. 1, 1921.
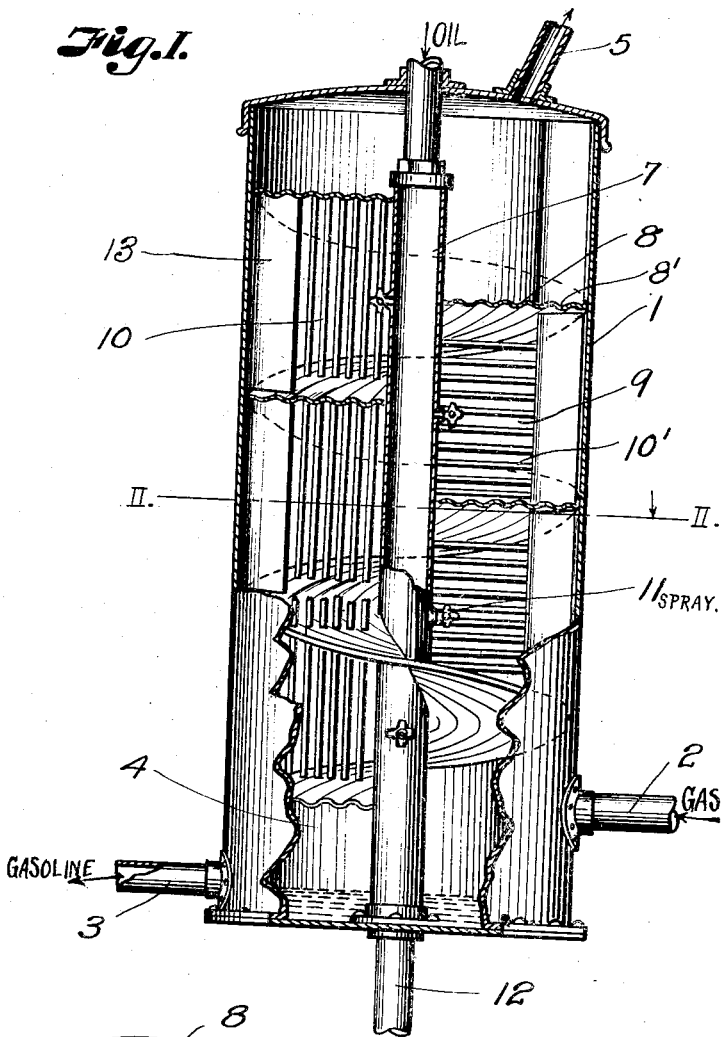
Fig. I.
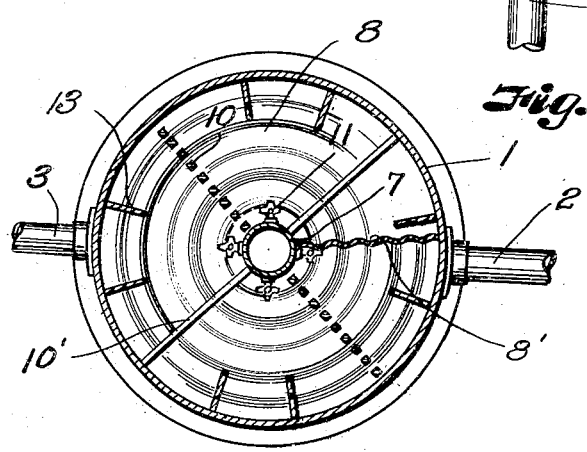
Fig. II.
INVENTOR
Thomas Wight.
BY Arthur C. Brown
ATTORNEY

UNITED STATES PATENT OFFICE.

THOMAS WIGHT, OF KANSAS CITY, MISSOURI.

ABSORPTION-TANK.

1,395,463.  Specification of Letters Patent.  Patented Nov. 1, 1921.

Application filed July 22, 1918. Serial No. 246,016.

*To all whom it may concern:*

Be it known that I, THOMAS WIGHT, a citizen of the United States, residing at Kansas City, in the county of Jackson and State of Missouri, have invented certain new and useful Improvements in Absorption-Tanks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a tank provided with means for separating gasolene or similar highly volatilized hydro-carbon oils from natural gas whereby the gasolene may be separated from natural gas in a convenient manner by absorption. The prime object is to provide means for accomplishing this within a relatively small compass.

Another object of the invention is to provide means for insuring the complete separation of the gasolene. It is also the purpose of the invention to carry out the necessary steps in an expeditious manner.

In the drawings,

Figure I is a sectional view through a tank constructed in accordance with my invention, and Fig. II is a sectional view on the line II—II of Fig. I.

Referring now to the drawings by numerals of reference:

1 designates an absorption tank having a gas inlet 2 near the bottom and a gasolene discharge 3 leading from the oil chamber 4. 5 designates a gas outlet. Within the tank 1 is shown a stand-pipe 7, around which is a vertically disposed, spiral baffle 8 providing a spiral passageway or chamber 9, the baffle being preferably corrugated to provide oil grooves 8'. Within the chamber 9 is a plurality of grids 10 and 10', those designated 10 being vertical and those 10' extending horizontally across the tank. Leading from the stand-pipe is shown a plurality of atomizer nozzles 11 which are adapted to supply oil upon the grid elements in the form of thin films, the essential characteristics of the oil used being that it has an affinity for gasolene.

In carrying out the invention, the oil will preferably be sprayed through the nozzles 11 in a finely divided condition. The spray consists of minute portions or atoms of oil so that the incoming gasolene, passing upwardly through the tortuous passage 9, may have a relatively great surface area to attack. As the oil is sprayed from the nozzles it will form on the grids in thin films so that the gasolene may be quickly absorbed and as the absorption takes place, the oil will gravitate upon the floor of the spiral and discharge into the oil chamber 4. From the oil chamber, the oil may pass through the port 3 to a suitable collecting receptacle after which the oil may be distilled to recover the gasolene. The oil may enter the stand-pipe 7 from either end but as here shown the stand-pipe is provided with an outlet orifice at its lower end 12.

By the construction herein shown, the separation of the gasolene from natural gas may expeditiously take place because the oil is initially introduced into the absorption tank in finely atomized condition so as to present a maximum absorbing surface for the gas and as the oil passes over the grids, an additional absorbing surface is provided by the film formed, the thickness of which is such as to permit penetration by the gas. As the heavier constituents of the gas are carried off by the oil, the lighter constituents of the gas, which have not been absorbed, will pass off through the gas orifice 5.

13 are vertically arranged inwardly projecting baffles which arrest the passage of the sprayed oil and gas and assist in precipitating these fluids in the form of gasolene.

Having thus described my invention, what I claim as new therein, and desire to secure by Letters-Patent is:

1. An absorption tank for gasolene comprising a casing having a gas inlet, a spiral chamber in the casing, oil film supporting grids in the chamber, and oil discharge spray nozzles in the casing.

2. An absorption tank for gasolene comprising a casing having a gas inlet, a tortuous chamber in the casing and extending from end to end, oil film supporting grids in the chamber, and oil discharge nozzles in the casing.

3. An absorption tank for gasolene comprising a casing having a gas inlet at the bottom thereof, a gas outlet at the upper part of the casing, said casing having an oil chamber in the bottom thereof provided with an outlet, a spiral baffle above the oil chamber, oil film supporting grids between the walls of the spiral, and means for supplying oil to said grids.

4. An absorption tank for gasolene comprising a casing having a vertical spiral baffle therein, atomizer nozzles for discharging oil into the spiral space formed by the baffle, a gas inlet, a gas outlet, an oil inlet at the upper portion of said casing, and an oil outlet at the bottom of said casing.

5. An absorption tank for gasolene comprising a casing having a gas inlet, a vertical spiral baffle in the casing, atomizer nozzles for discharging oil into the spiral space formed by the baffle, oil film supporting grids in the tank comprising alternate groups of horizontally and vertically arranged bars in the casing, and an oil discharge port for the casing.

6. An absorption tank for gasolene, comprising a casing having oil and gas inlets and oil and gas outlets, a vertical, spiral baffle in the casing provided with grooves in the upper face thereof, and grids in the space formed by the baffles.

In testimony whereof I affix my signature.

THOMAS WIGHT.